United States Patent [19]

Iketaki et al.

[11] 3,821,467

[45] June 28, 1974

[54] MAGNETIC RECORDING AND/OR REPRODUCING APPARATUS

[75] Inventors: Kazuo Iketaki, Kanagawa; Kazuo Hashizaki, Tokyo, both of Japan

[73] Assignee: Sony Corporation, Shinagawa-ku, Tokyo, Japan

[22] Filed: Dec. 16, 1971

[21] Appl. No.: 208,629

[30] Foreign Application Priority Data

Dec. 19, 1970 Japan .............................. 45-114841

[52] U.S. Cl. .............................................360/70
[51] Int. Cl. ............................................. H04n 5/78
[58] Field of Search .......... 178/6.6 A, 6.6 P, 6.6 TC

[56] References Cited

UNITED STATES PATENTS

| | | | |
|---|---|---|---|
| 3,213,193 | 10/1965 | Konishi | 178/6.6 P |
| 3,573,359 | 4/1971 | Guisinger | 178/6.6 P |
| 3,585,291 | 6/1971 | Yamakawa | 178/6.6 P |

*Primary Examiner*—James W. Moffitt
*Attorney, Agent, or Firm*—Lewis H. Eslinger, Esq.; Alvin Sinderbrand, Esq.

[57] ABSTRACT

A control system for a video tape reproducing apparatus having a rotary magnetic head assembly to scan the tape obliquely. The system compensates for phase distortions, known as jitter components, in the reproduced video signal and mainly caused by variations in tape tension during the reproduction. A phase distortion sensing means detects the time interval between a first reference signal in a part of the reproduced signal just before the end portion of one oblique track on the tape and a second reference signal in a part of the reproduced signal at or shortly after the beginning portion of the next track on the tape, and generates a control signal corresponding to the time interval. The control signal is used for controlling tape tension to compensate for phase distortions in the reproduced video signal.

8 Claims, 14 Drawing Figures

INVENTORS
KAZUO IKETAKI
KAZUO HASHIZAKI

BY

ATTORNEY

INVENTORS
KAZUO IKETAKI
BY KAZUO HASHIZAKI

INVENTORS
KAZUO IKETAKI
KAZUO HASHIZAKI

BY

ATTORNEY

MAGNETIC RECORDING AND/OR REPRODUCING APPARATUS

BACKGROUND OF THE INVENTION

1. Field of the Invention

This invention relates generally to magnetic tape apparatus having a rotary magnetic head assembly for scanning the tape helically. The invention relates more particularly to a control system that controls the driving condition of the tape during playback to obtain improved reproduced signals.

2. Description of the Prior Art

When a video signal is recorded on magnetic tape by a rotary magnetic head, the recording is in the form of a plurality of parallel tracks that extend obliquely across the tape. When the tape is played back, the oblique tracks are scanned by a rotary magnetic head, which may be the same as the recording head, to reproduce the recorded signal. Generally, the location of these tracks on the magnetic tape is detected by means of control signals also recorded thereon. The angular velocity of the rotary magnetic head is also detected and is servo-controlled so that the scanning position of the rotary magnetic head at the start of each track will be correct.

If the length of the tape at the time it is played back remains the same as when the recording was made, the recorded signal can be correctly reproduced. However, the tape frequently stretches lengthwise, causing the slant tracks to become more inclined. The control signals will cause the tape drive means to move the tape at the proper speed to compensate for the increased length, but due to the change in inclination of the tracks, the rotary magnetic head will correctly coincide with each slant track only at the starting position thereof. Because the rotary magnetic head is adapted to scan the oblique tracks correctly only under normal condition of the magnetic tape, the head will gradually deviate from each track as the scanning proceeds. The video signal reproduced from stretched tape will be correct, i.e. its deviation in phase will be at a minimum at the beginning of each track, but the signal obtained at the end of the scanning of the head on each track will have a maximum phase deviation.

Usually, a signal of one field is recorded on one track, with the vertical synchronizing signal recorded at the beginning of the track. The rotary magnetic head shifts from one track to the subsequent one during each vertical blanking period. Consequently, the deviation in phase of the reproduced video signal is at a maximum immediately before each vertical synchronizing signal and at a minimum immediately after it. Such phase deviation is referred to as jitter in the reproduced video signal.

Hitherto, several systems have been proposed to compensate for jitter thus produced. One of the prior systems controls the tape tension so that it is constant during recording and reproducing. This is based on the fact that jitter is mainly due to variations in the tape tension, but this system is defective in that efficient and correct compensation cannot be achieved because control of the tape tension is a form of absolute control, not feedback control. In another system, a feedback control system has been proposed using detection of jitter during playback and is used to control the tape tension, but such a system is also defective because the construction of a jitter detector or the like is extremely complicated.

Accordingly, it is an object of this invention to provide magnetic tape apparatus with a novel system for compensating for signal deteriorations which are caused by changes in tape length and which become manifest during playback.

Another object of this invention is to provide a signal improving system for a magnetic tape recording and reproducing apparatus having a rotary magnetic head assembly to scan a magnetic tape obliquely and which controls the tape driving means to compensate for signal deteriorations caused by variations in the driving condition of the tape.

A further object of this invention is to provide an improved tape tension control system for a magnetic tape recording and reproducing apparatus to compensate for signal deteriorations caused by variations in tape tension during reproducing.

Still another object of this invention is to provide an improved compensation system for a video signal recording and reproducing apparatus using a magnetic tape which reduces jitter by controlling the tape tension during playback to eliminate jitter components from reproduced signals and pictures.

Other objects and aspects of this invention will be apparent from the following specification, together with the drawings.

BRIEF DESCRIPTION OF THE INVENTION

In accordance with this invention, means are provided to utilize a specific horizontal synchronizing signal near the end of each field to initiate a timing interval. Another signal that occurs at, or at a specific time after, the beginning of the next field is used to terminate the timing interval. The latter signal may conveniently be the leading edge of the vertical synchronizing signal, itself. The duration of the timing interval is a measure of the deviation (if any) between the time that the initiating pulse should occur and the time that it does occur. This is also a measure of the jitter produced by change in the length of the tape, since it is this change in length that produces the deviation in time.

The initiating signal may trigger a rectangular pulse which can then be integrated to form a sawtooth wave. The latter can be sampled by the terminating pulse to indicate, by the amplitude of the resultant sample signal, the time between the initiating pulse and the terminating pulse. A control signal can then be produced by means of the sample signal.

DESCRIPTION OF THE PREFERRED EMBODIMENTS

Figure 1:
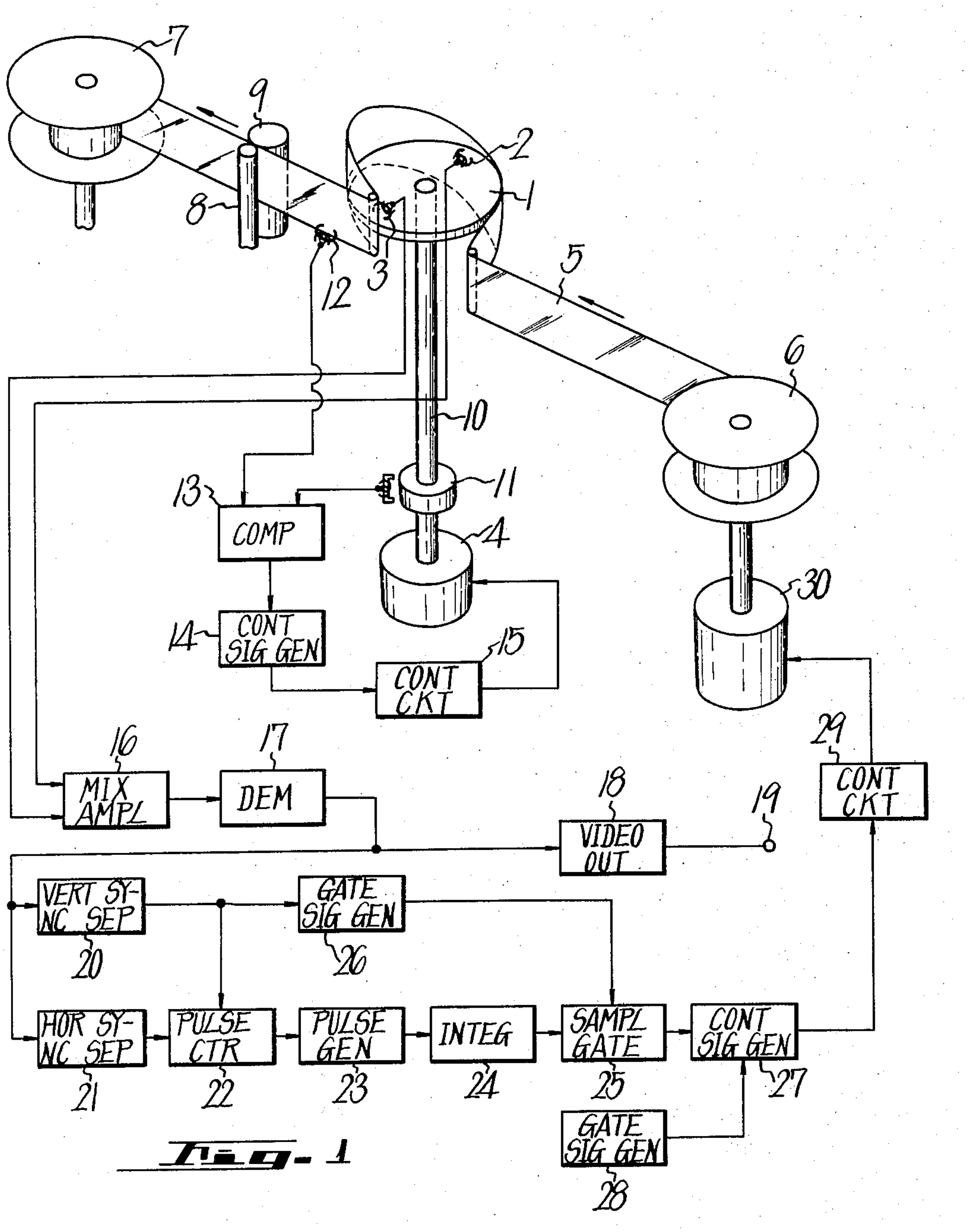
FIG. 1 is a diagram showing one example of a magnetic tape reproducing apparatus including the features of this invention.

The apparatus in FIG. 1 includes a rotary assembly 1 that has two magnetic heads 2 and 3 spaced apart an angular distance of 180°. The rotary magnetic head assembly 1 is driven by a motor 4 at a predetermined rotational speed, or angular velocity. A magnetic tape 5 is stretched from a supply reel 6 to a take-up reel 7 and is driven by a capstan 8 and a pinch roller 9. Between the supply reel 6 and the take-up reel 7 the magnetic tape 5 is helically wrapped around the rotary magnetic head assembly 1 and is obliquely scanned by the magnetic heads 2 and 3, alternately. In the present example, the magnetic heads are designed to reproduce a video signal of one field (one vertical period) with one scanning of a single oblique track, and a vertical synchronizing signal is reproduced at the beginning of each scanning.

A shaft 10 is provided for rotating the magnetic head assembly 1, and a detecting means 11 for detecting the rotational speed and phase of the rotary magnetic heads 2 and 3 is mounted on this shaft. A fixed magnetic head (a control head) 12 is provided for reproducing a control signal recorded on a control track area of the magnetic tape 5 to detect the tape traveling speed. The outputs from the detecting means 11 and the control head 12 are supplied to a comparator 13 to be compared with each other, and the compared output is supplied to a control signal generator 14 to cause it to produce a control signal corresponding to the compared output. The control signal is applied to a motor control circuit 15 to control the motor 4 to keep the magnetic tape 5 and the rotary magnetic heads 2 and 3 in correct relation to each other at all times. This ensures that the starting position of each scanning of the tape by the rotary magnetic heads always agrees with the starting position of each track recorded on the magnetic tape 5. This rotation control system for the rotary magnetic head assembly has been known heretofore.

The signals reproduced by the rotary magnetic heads 2 and 3 are mixed together in a mixing amplifier 16 and are then applied to a demodulator 17. Since the signal is usually recorded on the magnetic tape as a frequency-modulated signal, the demodulator 17 must be suitable to change it back into the original video signal. The demodulated video signal passes through a video output circuit 18 to an output terminal 19 and may then be supplied to, for example, a monitor receiver for display.

Figures 2A, 2B, 2C, 2D, 2E, 2F, 2G, 2H, 2I:
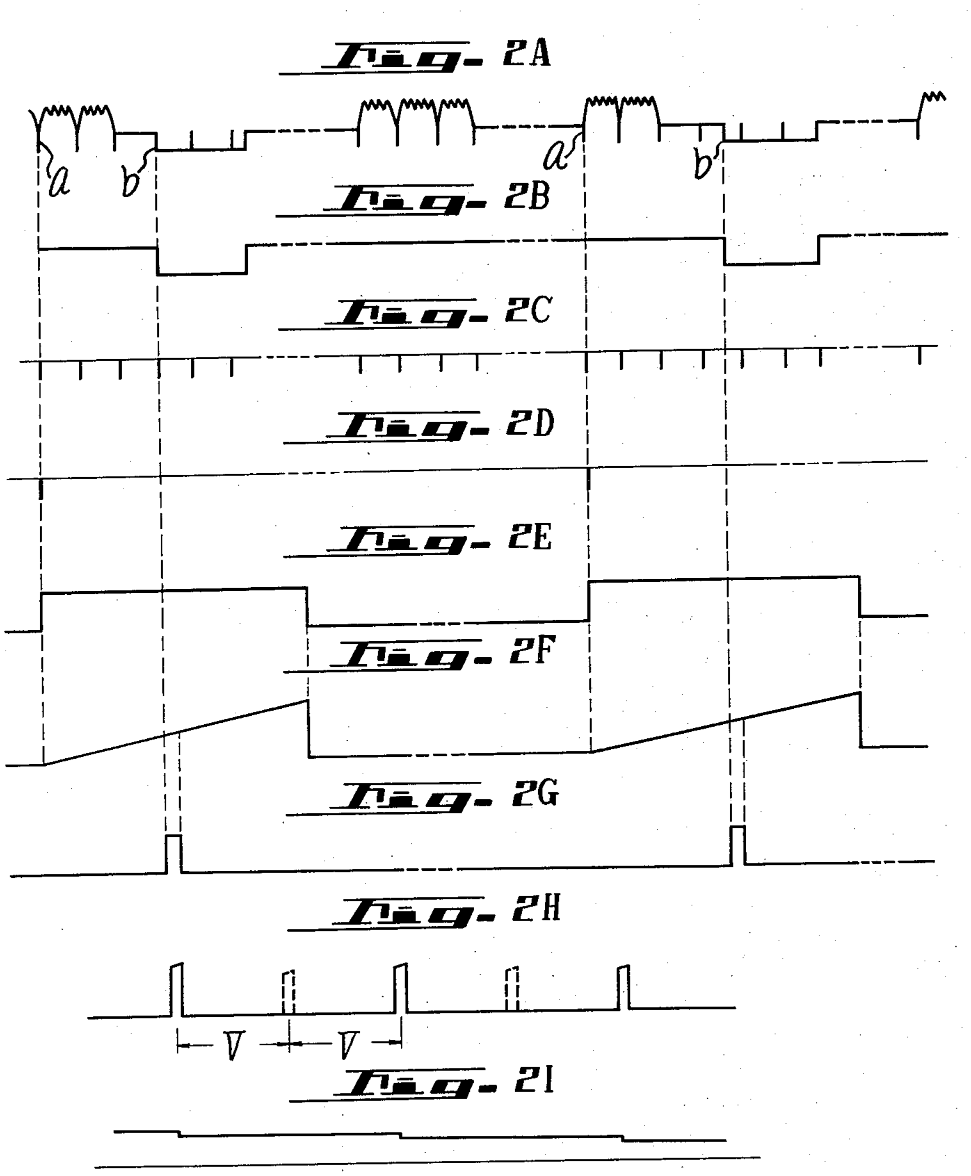
FIGS. 2A to 2I, inclusive, are waveform diagrams for explaining the apparatus exemplified in FIG. 1.

In the foregoing apparatus, a reproduced video signal of the type depicted in FIG. 2A is derived from the demodulator 17 and is applied to a vertical synchronizing signal separator circuit 20 and to a horizontal synchronizing signal separator circuit 21 to separate out the video signal vertical and horizontal synchronizing signals shown in FIGS. 2B and 2C. The output from the horizontal synchronizing signal separator circuit 21 is applied to a pulse counter circuit 22. The pulse counter circuit 22 produces an output signal when a predetermined horizontal synchronizing signal that occurs just before the vertical synchronizing signal is applied to it. For example, when the video signal recorded on one magnetic track is an NTSC video signal of 525 lines per frame, or 262½ lines per field, the pulse counter circuit 22 is designed to derive at its output terminal a pulse signal as depicted in FIG. 2D when the pulse counter 22 has counted 259 horizontal synchronizing signals from the leading edge of the vertical synchronizing signal at the start of each field. Further, the pulse counter 22 is reset by the vertical synchronizing signal. The output pulse, shown in FIG. 2D, is derived from the pulse counter 22 and is applied to synchronize a pulse signal generator 23 that produces a pulse signal of a predetermined width, as shown in FIG. 2E. The pulse signal generator 23 may be a monostable-multivibrator that generates a pulse of a predetermined width, for example seven line periods, initiated by the pulse from the counter 22 and terminated at a time determined by the time constant of the monostable-multivibrator. The output from the pulse signal generator 23 is integrated by an integrator circuit 24 to provide a sawtooth wave signal shown in FIG. 2F. The timing of the sawtooth wave signal is such that when no jitter component is contained in the reproduced video signal, the leading edge of the vertical synchronizing signal depicted in FIG. 2B may correspond substantially to the midpoint of the slope of the sawtooth wave signal. The output of the integrator circuit 24 is supplied to a sampling gate circuit 25 and is sampled by a pulse signal that corresponds to the occurrence of the vertical synchronizing signal at the starting portion of each track. This sampling pulse signal is derived from the vertical synchronizing signal separator circuit 20. The sampling pulse thus obtained is supplied to the sampling gate circuit 25 to derive at the output terminal of the gate circuit a pulse the amplitude of which corresponds to the amplitude of the sawtooth derived from the integrator circuit 24 at that instant. This output voltage is, therefore, dependent on the elapsed time from the pulse generator 23 until the signal (the vertical synchronizing signal) at the beginning of the subsequent track is obtained. This output voltage increases and decreases with an increase and decrease in the time interval between the two signals. Thus, the signal at the beginning of scanning of each track is correctly reproduced, or, at least, is reproduced with the minimum phase deviation, by servo control of the rotation of the head assembly 1.

The deviation in time, relative to the vertical synchronizing signal, of the horizontal synchronizing signal obtained just before each rotary magnetic head shifts from one track to the subsequent one, which deviation is caused by the relative deviation between the track on the tape and the rotary head, is detected as a phase deviation. This is illustrated as the phase deviation between points a and b in FIG. 2. Since odd- and even-number fields of the video signal are normally interlaced, there is a difference of 0.5 line interval between the time from the last horizontal synchronizing signal of the odd-number field to the first vertical synchronizing signal of the even-number field and that from the even-number field to the odd-number one. Accordingly, even if the tracks on the magnetic tape are correctly scanned by the rotary magnetic heads 2 and 3, the signal obtained from the gate 25 in response to detection between the odd-number field and the even-number one and that between the even-number field and the odd-number one will be diferent from each other in the relative position of the gate signal from the gate signal generator 26 to the sawtooth wave signal from the integrator circuit 24. As a result of this, the outputs from the sampling gate circuit 25 differ between successive pairs of fields. Consequently, a control signal generator 27 is provided to extract alternate ones of output pulses derived from the sampling gate circuit 25 as depicted in FIG. 2H. Based on the extracted output, the control signal generator 27 produces a voltage such as shown in FIG. 2I which serves as a control signal. To separate out alternate ones of the pulses shown in FIG. 2H, a gate signal generator 28 is provided and a gate signal derived therefrom is supplied to the control signal generator 27.

Figure 3:
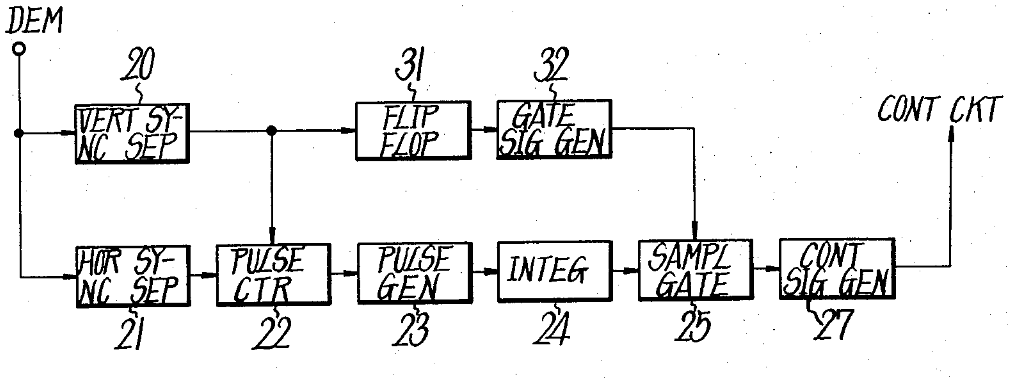
FIG. 3 is a block diagram illustrating a modified form of this invention.
Figure 4A:
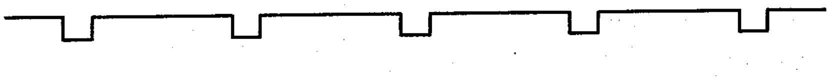
FIGS. 4A to 4C, inclusive, are waveform diagrams for explaining the example of FIG. 3.
Figure 4B:
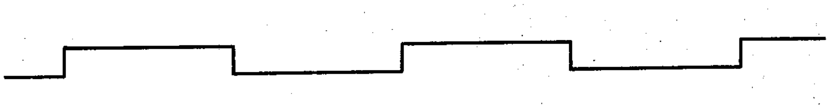
Figure 4C:
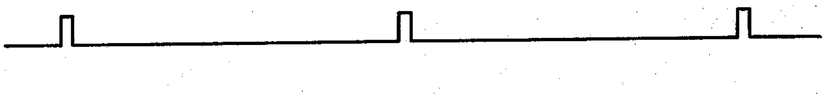

It is also possible to supply the gate signal to the sampling gate circuit every other field. FIG. 3 illustrates one example of the construction therefor. In the illustrated example, a flip-flop circuit 31 is driven by a vertical synchronizing signal, as shown in FIG. 4A, which is derived from the vertical synchronizing signal separator 20. A gate signal is produced by a gate signal generator 32 in response to the rising of the output from the flip-flop circuit 31. The output from the flip-flop circuit 31 is depicted in FIG. 4B, which rises every other field, so that the gate signal is also produced every other field as shown in FIG. 4C and is supplied to the sampling gate circuit 25.

The voltage derived from the control signal generator 27 is applied to a tape back tension control device to control the back tension of the magnetic tape to ensure that the rotary magnetic heads correctly scan the tracks on the tape. In the present invention, the output from the control signal generator 27 is supplied to a control circuit 29 to control a motor 30 for driving the supply reel 6. For controlling the back tension of the magnetic tape, it is also possible to control braking to the supply reel or to control the driving force of the capstan on the side of the supply or take-up reel in the case of the so-called double capstan construction.

As has been described in the foregoing, the phase deviation, or jitter components, in the reproduced video signal due to the relative deviation of the tracks on the magnetic tape to each of the rotary magnetic heads is detected by detecting the time interval between reference signals extracted from signals before and after the head shifts from one track to a subsequent one and the relative deviation of the tracks on the tape to each of the rotary magnetic heads is eliminated by the detected output, so that the jitter components are effectively compensated.

With the present invention, the jitter component in the reproduced video signal can be compensated by the feedback control system as has been described in the foregoing, so that the jitter component can be efficiently compensated. Further, since this invention compensates the jitter component with a signal contained in the reproduced video signal, it is possible to compensate jitter component produced by wow and flutter of the rotary magnetic head during recording.

In the foregoing the vertical and horizontal synchronizing signals are extracted as reference signals from the reproduced video signal to provide comparison signals, but it is also possible to insert reference signals into the reproduced video signals to be reproduced before and after shifting of the rotary magnetic heads 2 and 3 from one track to a subsequent one, in which case the phase deviation between the reference signals is detected.

It will be apparent that many modifications and variations may be effected without departing from the scope of the novel concepts of this invention.

What is claimed is:

1. A reproducing system for a magnetic tape apparatus which uses a magnetic tape on which a signal is recorded in the form of a plurality of oblique tracks, said reproducing system comprising:

A. A rotary magnetic head assembly for reproducing the signal recorded on the tape by scanning said tracks;

B. Means for controlling the rotation of said rotary magnetic head assembly so that, at the start of each scanning of a track, the position of the magnetic head coincides with the beginning portion of the respective track on the magnetic tape;

C. Circuit means connected to said rotary magnetic head assembly to be supplied with the signal therefrom and to change the signal into its original form;

D. First producing means for producing a first reference signal synchronized to occur at a first predetermined time just prior to the end of one scanning of one of said oblique tracks by said rotary magnetic head assembly;

E. Second producing means for producing a second reference signal synchronized to occur at a second predetermined time at the beginning of the next scanning of the next oblique track by said rotary magnetic head assembly;

F. Means for detecting the time interval between said first and second reference signals and for producing a control signal in response to the detected time interval; and G. Control means for controlling tension of said tape in accordance with said control signal during the reproducing condition of said apparatus, thereby to compensate for deteriorations in the reproduced signal.

2. The reproducing system of claim 1 comprising, in addition, gating means to gate said system to utilize the measurement of said time interval only when said head assembly is reproducing the signal recorded on alternate ones of said tracks.

3. A reproducing system according to claim 1, in which said control means controls driving means for the magnetic tape.

4. A reproducing system for a video signal reproducing apparatus which uses a magnetic tape on which a modulated video signal of each vertical period is recorded on each of a plurality of oblique tracks, said reproducing system comprising:

A. A rotary magnetic head assembly for reproducing the video signal of said each vertical period recorded on the tape by scanning each of said tracks sequentially;

B. Means for controlling the rotation of said rotary magnetic head assembly so that, at the start of each scanning, the position of the magnetic head properly coincides with the beginning portion of the respective track on the magnetic tape;

C. Demodulator means connected to said head assembly to be supplied with reproduced video signals from said head assembly to demodulate said signals;

D. Counter means connected to receive the demodulated signals and to count horizontal synchronizing pulses therein;

E. First producing means for producing a first reference signal and connected to said counter to be synchronized by a predetermined one of said horizontal synchronizing pulses of the demodulated video signal reproduced just prior to the end of one scanning of one of said tracks by said rotary magnetic head assembly;

F. Second producing means for producing a second reference signal and synchronized by a portion of the demodulated video signal reproduced at the beginning of the scanning of the next one of said tracks by said rotary magnetic head assembly;
G. Means for detecting the time interval between said first and second reference signals;
H. Means for producing a control signal in response to the detected time interval; and
I. Control means for controlling tape tension in accordance with said control signal during the reproducing condition of the apparatus thereby to compensate for phase distortions in the reproduced video signal.

5. A reproducing system according to claim 4, in which said rotary magnetic head assembly reproduces the video signal of a field period during each scanning, each field having a vertical synchronizing signal at the beginning of the respective scanning and said first and second extracting means including horizontal synchronizing signal gating means and vertical synchronizing signal gating means, respectively.

6. A reproducing system according to claim 5, in which said first extracting means extracts a particular horizontal synchronizing signal counted from the first one in one field period as said first reference signal, and said second extracting means extracts the next vertical synchronizing signal as said second reference signal.

7. A reproducing system according to claim 6, in which said detecting means generates a detected output in proportion to the time interval between said extracted particular horizontal synchronizing signal and said next vertical synchronizing signal, and said control means comprises a control circuit connected to said detecting means to generate said control signal in response to the detected output of said detecting means.

8. A reproducing system according to claim 4 comprising, in addition:
A. A supply reel from which said magnetic tape is paid out; and
B. Driving means for said supply reel, and said control means controls said driving means.

* * * * *